Oct. 31, 1950        A. B. HURLEY        2,528,311

COMBINATION BLACKBOARD AND PROJECTION SCREEN

Filed April 2, 1946        2 Sheets—Sheet 1

INVENTOR
ALBERT B. HURLEY
BY
ATTORNEYS

Oct. 31, 1950        A. B. HURLEY        2,528,311

COMBINATION BLACKBOARD AND PROJECTION SCREEN

Filed April 2, 1946        2 Sheets-Sheet 2

INVENTOR
ALBERT B. HURLEY
ATTORNEYS

Patented Oct. 31, 1950

2,528,311

UNITED STATES PATENT OFFICE 2,528,311

COMBINATION BLACKBOARD AND PROJECTION SCREEN

Albert B. Hurley, Huntington, N. Y.

Application April 2, 1946, Serial No. 658,995

7 Claims. (Cl. 235—63)

This invention relates to a combination blackboard and projection screen.

As teaching aids and articles of classroom furniture portable blackboards and portable projection screens are, of course, well-known. It has in the past, however, been the practice to construct each of these as a separate unit. As a result, if a teacher wishes to lecture with the aid of a blackboard and then exhibit a training film, he must take the time and expend the energy necessary to move the blackboard to one side and move the projection screen to a position in front of the class.

Further drawbacks are inherent in the structure of the common portable projecting screen. Its screen surface cannot be constantly exposed, for sunlight and an accumulation of air-carried dirt would soon render it unfit for use. The most common expedient is to employ a screen rolled up in the manner of a window shade. In order for such a screen to be opened, it must be placed at a height such that a teacher of normal stature can reach it. However, when the screen is placed at this height, it is not in its optimum position, insofar as visibility is concerned. Since classrooms are ordinarily not inclined in the fashion of theatres, in order for all students to have unimpeded visual access to the screen, it must be placed considerably above floor level. If the screen is placed at its optimum height insofar as visibility is concerned, it will then be at an excessive height insofar as manipulation by the teacher is concerned.

It is, therefore, an object of the present invention to provide in a single structure a combination blackboard and projection screen designed for convenient classroom use.

It is a further object of the present invention to provide a combination blackboard and projection screen in which the choice of surface to be presented to the class may be easily effectuated by the teacher.

It is still another object of the present invention to provide a combination blackboard and projection screen in which the projection screen surface, when not in use, is protected from discoloration and deterioration resulting from sunlight and air-carried particles of dirt.

It is yet another object of the present invention to provide such a structure in which the blackboard surfaces may be used at a height most suitable for receiving writing thereon and in which the projection screen surfaces may be used at an elevated height more suitable for receiving projected images thereon.

Yet another object of the present invention is to provide a structure of the type described in which, at the same time that a projection screen is exposed at a suitable height, a blackboard surface is simultaneously exposed in close proximity thereto, whereby notes, drawings or sketches made by the teacher on said blackboard surface prior to the showing of the film may be constantly before the class throughout the showing of the film, the diffused light from the projector being sufficient to illuminate the blackboard surface.

It is still another object of the present invention to provide a structure of the type described which carries a plurality of blackboard or other surfaces, thus adding to the flexibility of its use.

To the accomplishment of the foregoing objects and such other objects as may hereinafter appear, my present invention relates to the combination blackboard and projection screen as sought to be defined in the appended claims and as described in the following specification, taken together with the accompanying drawings, in which:

Figure 1:
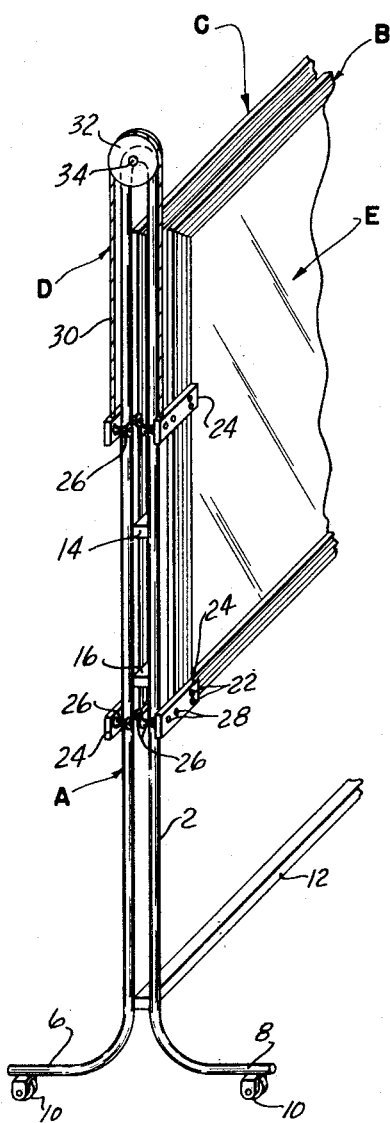
Fig. 1 is a fragmentary perspective view with the mounting frames in intermediate position.
Figure 2:
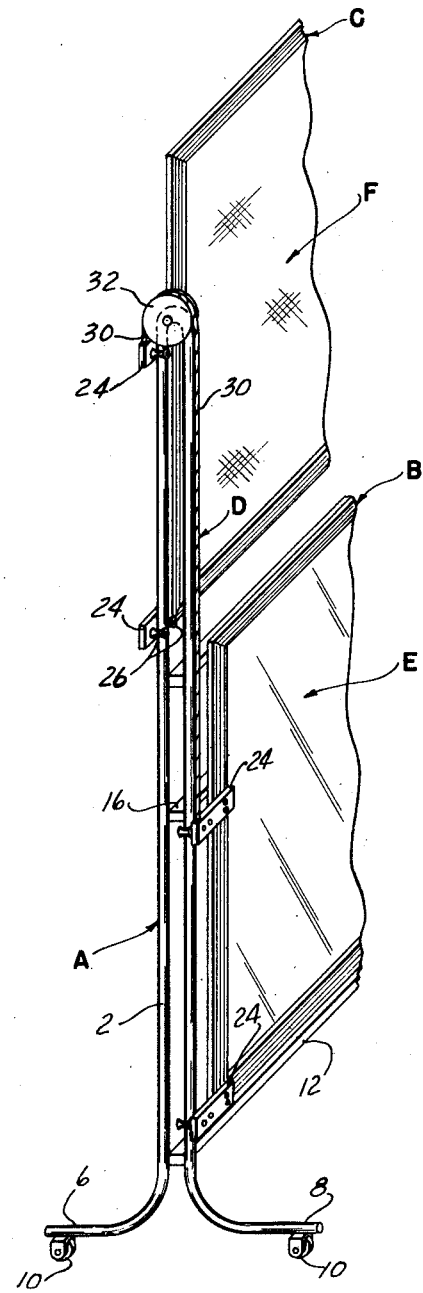
Fig. 2 is a fragmentary perspective view with the mounting frames at one extreme limit of their travel.
Figures 3, 4:
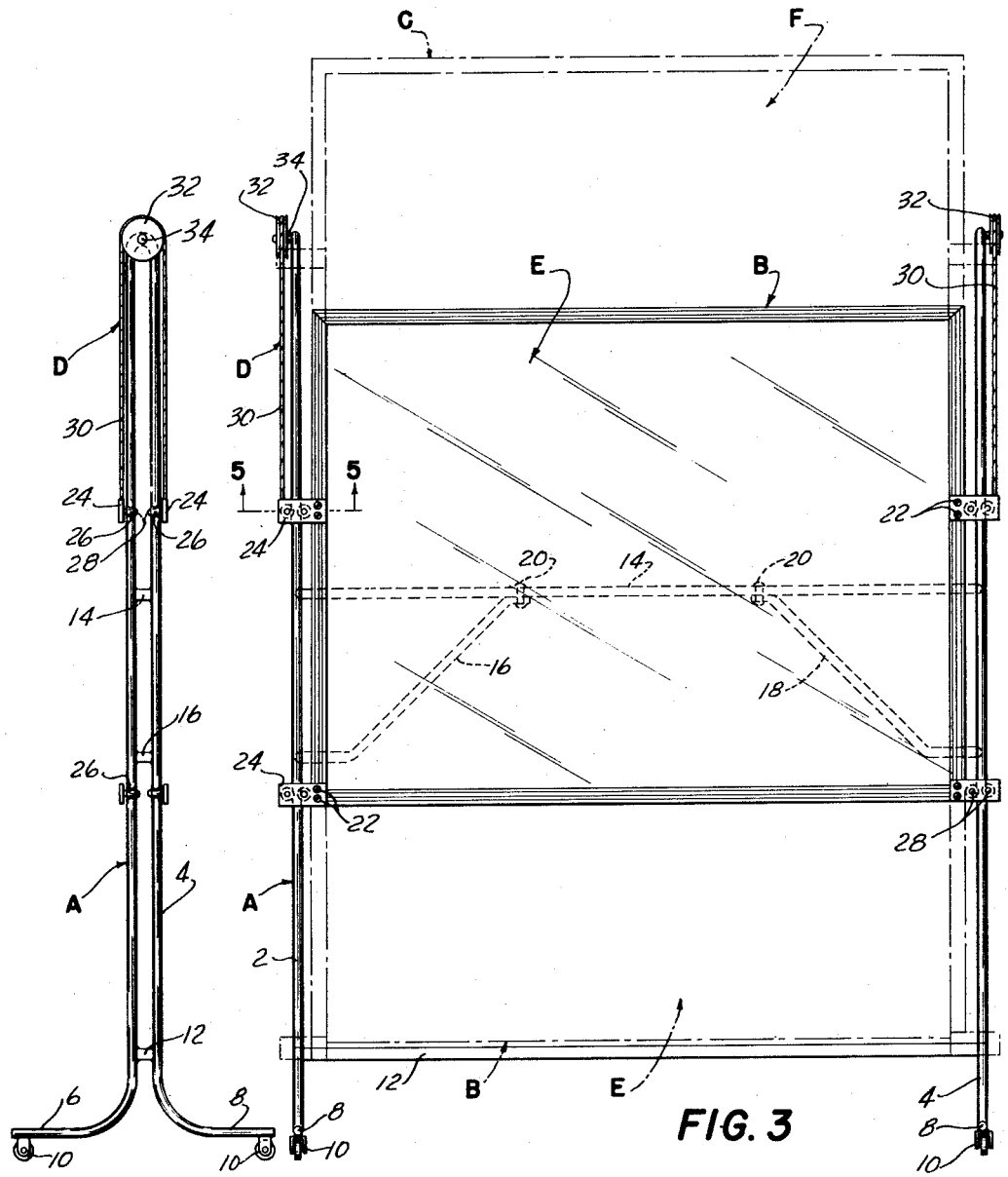
Fig. 3 is a front view with the mounting frames shown in solid lines at an intermediate position of travel and in broken lines at one extreme limit of their travel.
Fig. 4 is a side view with the mounting frames at an intermediate position of travel.

Referring now to the drawings more in detail, my combination blackboard and projection screen comprises a support, generally designated A, on which are mounted two mounting frames, generally designated B and C, each of which is vertically movable with respect to the support A and one with respect to the other. A means, generally designated D, so connects the two frames that as one frame is moved down the other frame moves up. One side of the mounting frame B may carry a blackboard E having an exposed blackboard surface and the corresponding side of the mounting frame C may carry a projection screen F having an exposed surface suitable for use with a picture projector. Frames B and C are so dimensioned that when frame B is moved to its lower extremity of travel and frame C is moved to its upper extremity of travel (see Fig. 2) neither frame interferes with vision of the other. In addition, the entire structure is so dimensioned that when a frame is at its intermediate position of travel (see frame B in Figs. 1 and 3), it is at a height most convenient to be written upon, when a frame is at its upper extremity of travel (see frame C in Fig. 2 and upper broken lines of Fig. 3), it is in a position most suitable for acting as a projection screen, and when a frame is at its lower extremity of travel (see frame B in Fig. 2 and lower broken lines of Fig. 3), it is most suitably positioned for display of whatever it carries on its surface (e. g. writing, drawings, posters).

Projection screens as commonly used are of a variety of types, among which may be mentioned the reflective screens—either the white screen defined by a surface layer of opaque white pigment such as titanium held within a binder, the screen surface defined by glass beads, or the screen surface defined by aluminum or silver-coated sheets formed with a plain or embossed surface—and the translucent screen by means of which an image projected on one side is visible through the screen on the other side. The white screen or plain aluminum or silver-coated screens are employed when a wide diffusion of reflected light is desired, and the glass beaded and aluminum or silver-coated embossed screens are employed when a relatively narrow reflection is desired. All reflective screens suitable for projection purposes are characterized by a light color, a very low light absorption coefficient, generally below 10%, and by a directive light guiding property. In the case of the translucent screen, there is necessarily more loss of light than in the reflective screen so that the light absorption coefficient is not as low as 10% but is normally somewhat larger, on the order of 25% or 30%. The viewing surface of the translucent screen may be appropriately shaped to provide the desired directive light guiding property. All of these projection screen types are well known to the art, and any of them may be employed as a projection screen F in the present invention.

The support A consists, in a preferred embodiment of my invention, of a pair of tubular members 2 and 4 each bent into the form of an elongated inverted U and having the extremities 6 and 8 of the two arms thereof bent to horizontal position in order to attain stability of the structure. The entire support A is mounted on casters 10 to facilitate movement of the assembly from one position to another in the classrooms. The two U-shaped members 2 and 4 are fastened together by transverse tie members 12 and 14 which may be welded thereto, and by stiffening members 16 and 18 which may be welded to the U-shaped members 2 and 4 and secured to the transverse member 14 by means of rivets or bolts 20.

Figure 5:
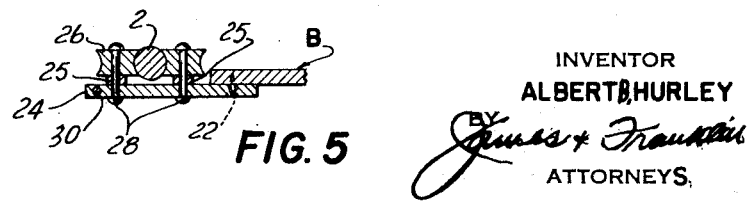
Fig. 5 is an enlarged cross-sectional view taken along the lines 5—5 of Fig. 3.

The mounting frame B is fastened by means of screws 22 to bearing mounts 24, each of which carries, spaced therefrom by spacers 25 a pair of concave surfaced bearing rollers 26 rotatably mounted on pins 28 and confining within their concave surfaces one tubular arm of the U-shaped members 2 and 4 so that the rollers 26 roll over, and hence the bearing support 24 and the mounting frame B are vertically movable with respect to, said members 2 and 4. (For mounting details see particularly Fig. 5.)

Frame C is similarly mounted on the other of the tubular arms of the U-shaped members 2 and 4 so that it too is vertically movable with respect to said members 2 and 4 in a plane parallel to the plane of movement of frame B.

The upper of the bearing supports 24 on each end of mounting frames B and C are connected by metal wires 30, fastened by welding or any other convenient means, which pass over sheaves 32 rotatably mounted on shafts 34 at the vertices of the U's of members 2 and 4. By means of this connection it is apparent that if frame B be pulled downward from its intermediate position the frame C will at the same time move upward. The upward motion of frame C, and consequently the downward motion of frame B, will be stopped when the upper bearing mounts 24 of frame C reach the sheaves 32, as in Fig. 2 and the upper broken lines of Fig. 3.

In a preferred form of my invention the outwardly disposed sides of mounting frames B and C will carry blackboards E the blackboard surfaces of which are exposed and the inner sides will carry projection screens F the reflective surfaces of which are exposed. Thus, when the frames are in their intermediate position of travel (see Fig. 1), blackboard surfaces will be presented on both sides of the structure and if the teacher fills one of those blackboard surfaces (e. g. surface E on mounting frame B), has more to write, and wishes to preserve that which he has written, he may rotate the support A on its casters 10 until the outer side of mounting frame C (also a blackboard surface) is presented to the class. Should the teacher then wish to display a film or a series of slides to the class, he need only pull mounting frame C down. As he does so, mounting frame B will rise and expose its inner surface (a projection screen surface) to the class at an optimum height for projection purposes while at the same time the matter carried on the blackboard surface of mounting frame C will still be presented to the class for their guidance in such a position that it will not interfere with vision of the projection screen but will be in close proximity thereto so that the light diffused from said projection screen will sufficiently illuminate the blackboard surface and the matter thereon.

In an alternative arrangement of surfaces both sides of the mounting frame B, for example, would carry blackboards E with their blackboard surfaces exposed while mounting frame C would expose on its outer side a blackboard surface and on its inner side a projection screen surface F as before. With this arrangement of surfaces it will be clear that a single structure will present three blackboard surfaces, thus affording the teacher more opportunity to write thereon, and still provide the teacher with a convenient projection screen surface which may be exhibited to the class at the proper height in conjunction with one of the blackboard surfaces as before. By suitably rotating the entire structure on the casters 10 and alternately raising and lowering the mounting frames B and C, the teacher can present to the class at will and in the proper position any desired surface of the structure.

Other arrangements of surfaces will suggest themselves. One very useful variation would be to provide the frame C with a translucent projection screen F, which type of screen is best adapted for projection in a room which has not been completely darkened. In the case of such a variation, a protective cover may be removably attached to the outwardly disposed side of the mounting frame C, the outer surface of which protective cover may, if desired, be provided with a blackboard surface E. As another alternative, one or more of the exposed surfaces of the frames B and C may be provided with a pin-up board to which suitable notes, posters or printed matter may be attached by thumb tacks.

While I have described my combination blackboard and projection screen in a preferred form, it will be apparent that many changes may be made therein without departing from the spirit of the invention defined in the following claims.

I claim:

1. A combination blackboard and projection screen comprising a support and a plurality of mounting frames mounted thereon and vertically movable with respect thereto, at least one of said frames carrying a blackboard having an exposed blackboard surface and at least one of said frames carrying a projection screen having an exposed surface suitable for use with a picture projector, said surface being characterized by having a light color, a very low light absorption coefficient, and a directive light guiding property.

2. A combination blackboard and projection screen comprising a support and a plurality of mounting frames mounted thereon and vertically movable with respect thereto and past one another in parallel planes, at least one of said frames carrying a blackboard having an exposed blackboard surface and at least one of said frames carrying a projection screen having an exposed surface suitable for use with a picture projector, said surface being characterized by having a light color, a very low light absorption coefficient, and a directive light guiding property.

3. A combination blackboard and projection screen comprising a support and two mounting frames mounted thereon and vertically movable with respect thereto and one with respect to the other in parallel planes, each of said frames carrying on one side a blackboard with an exposed blackboard surface and on the other side a projection screen with an exposed surface suitable for use with a picture projector, said surface being characterized by having a light color, a very low light absorption coefficient, and a directive light guiding property.

4. A combination blackboard and projection screen comprising a support and two mounting frames mounted thereon and vertically movable with respect thereto and one past the other in parallel planes, each of said frames carrying on the outer side thereof a blackboard having an exposed blackboard surface and on the inner side thereof a projection screen having an exposed surface suitable for use with a picture projector, said surface being characterized by having a light color, a very low light absorption coefficient, and a directive light guiding property.

5. A combination blackboard and projection screen comprising a support and two mounting frames mounted thereon and vertically movable with respect thereto and one with respect to the other in parallel planes, one of said frames carrying a blackboard with an exposed blackboard surface and the other of said frames carrying a translucent projection screen.

6. A combination blackboard and projection screen comprising a pair of connected inverted U-shaped side supports, a pair of mounting frames, each of said frames being slidably mounted on a different parallel leg of said side supports so that said frames are movable vertically with respect to one another in parallel planes, and spread legs at the ends of said side supports to attain stability of the structure, at least one of said frames displaying a blackboard surface and at least one of said frames displaying a projection screen surface.

7. A combination blackboard and projection screen comprising a pair of connected inverted U-shaped side supports, a pair of mounting frames, each of said frames being slidably mounted on a different parallel leg of said side supports so that said frames are movable vertically with respect to one another in parallel planes, sheaves rotatably mounted at the vertices of said side supports, flexible connections between said mounting frames and passing over said sheaves, and spread legs at the ends of said side supports to attain stability of the structure, at least one of said frames displaying a blackboard surface and at least one of said frames displaying a projection screen surface.

ALBERT B. HURLEY.

REFERENCES CITED

The following references are of record in the file of this patent:

UNITED STATES PATENTS

| Number | Name | Date |
| --- | --- | --- |
| 144,917 | Moeller | Nov. 25, 1873 |
| 281,112 | Mitchell | July 10, 1883 |
| 392,565 | Larew | Nov. 6, 1888 |
| 552,584 | Ouvrard | Jan. 7, 1896 |
| 692,354 | Ritchey | Feb. 4, 1902 |
| 864,090 | Fox-Esmond | Aug. 20, 1907 |
| 1,394,572 | Neil et al. | Oct. 25, 1921 |
| 2,161,587 | Pettis | June 6, 1939 |

FOREIGN PATENTS

| Number | Country | Date |
| --- | --- | --- |
| 6,796 | Great Britain | 1912 |
| 536,981 | Germany | 1931 |
| 639,528 | France | 1928 |